United States Patent
Cui et al.

(10) Patent No.: US 11,633,798 B1
(45) Date of Patent: Apr. 25, 2023

(54) BRAZE METHOD TO MODIFY A PASSAGE

(71) Applicant: General Electric Company, Schenectady, NY (US)

(72) Inventors: Yan Cui, Greer, SC (US); Matthew Joseph Laylock, Easley, SC (US); Elizabeth Byrne Beaudoin, Simpsonville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/457,304

(22) Filed: Dec. 2, 2021

(51) Int. Cl.
| | |
|---|---|
| *B23K 1/00* | (2006.01) |
| *F01D 5/00* | (2006.01) |
| *B23P 6/00* | (2006.01) |
| *B23K 101/00* | (2006.01) |
| *F01D 5/18* | (2006.01) |

(52) U.S. Cl.
CPC ........... *B23K 1/0018* (2013.01); *B23P 6/002* (2013.01); *F01D 5/005* (2013.01); *B23K 2101/001* (2018.08); *B23P 2700/06* (2013.01); *F01D 5/186* (2013.01); *F05D 2230/72* (2013.01); *F05D 2230/80* (2013.01)

(58) Field of Classification Search
CPC . B23P 6/002; B23P 15/02–04; B23P 2700/06; F01D 5/005; F01D 5/18; F01D 5/186; F05D 2230/72; F05D 2230/80; B23K 1/0018; B23K 2101/00
See application file for complete search history.

(56) References Cited

U.S. PATENT DOCUMENTS

| | | | |
|---|---|---|---|
| 6,370,752 B1 * | 4/2002 | Anderson | B23P 6/005 29/402.09 |
| 8,960,525 B2 | 2/2015 | Schick et al. | |
| 9,009,965 B2 | 4/2015 | Tragesser et al. | |
| 9,567,859 B2 | 2/2017 | Lacy | |
| 10,006,293 B1 * | 6/2018 | Jones | B23P 15/02 |
| 2005/0129519 A1 | 6/2005 | Beddard et al. | |
| 2014/0034144 A1 * | 2/2014 | Cui | B23K 1/0018 137/15.01 |

FOREIGN PATENT DOCUMENTS

JP      5341457 B2 * 11/2013 ............. B23P 6/007

OTHER PUBLICATIONS

Translation of JP-5341457-B2 (Year: 2013).*

* cited by examiner

*Primary Examiner* — Matthew P Travers
(74) *Attorney, Agent, or Firm* — James Pemrick; Charlotte Wilson; Hoffman Warnick LLC

(57) ABSTRACT

A process of modifying a passage in a component is provided. The process includes inserting a first material into the passage; blocking at least one end of the passage; inserting an elongated member into the passage through the first material; heat treating the passage, the first material, and the elongated member to form a solid interior in component; and machining through the solid interior to form a modified passage in the component.

20 Claims, 6 Drawing Sheets

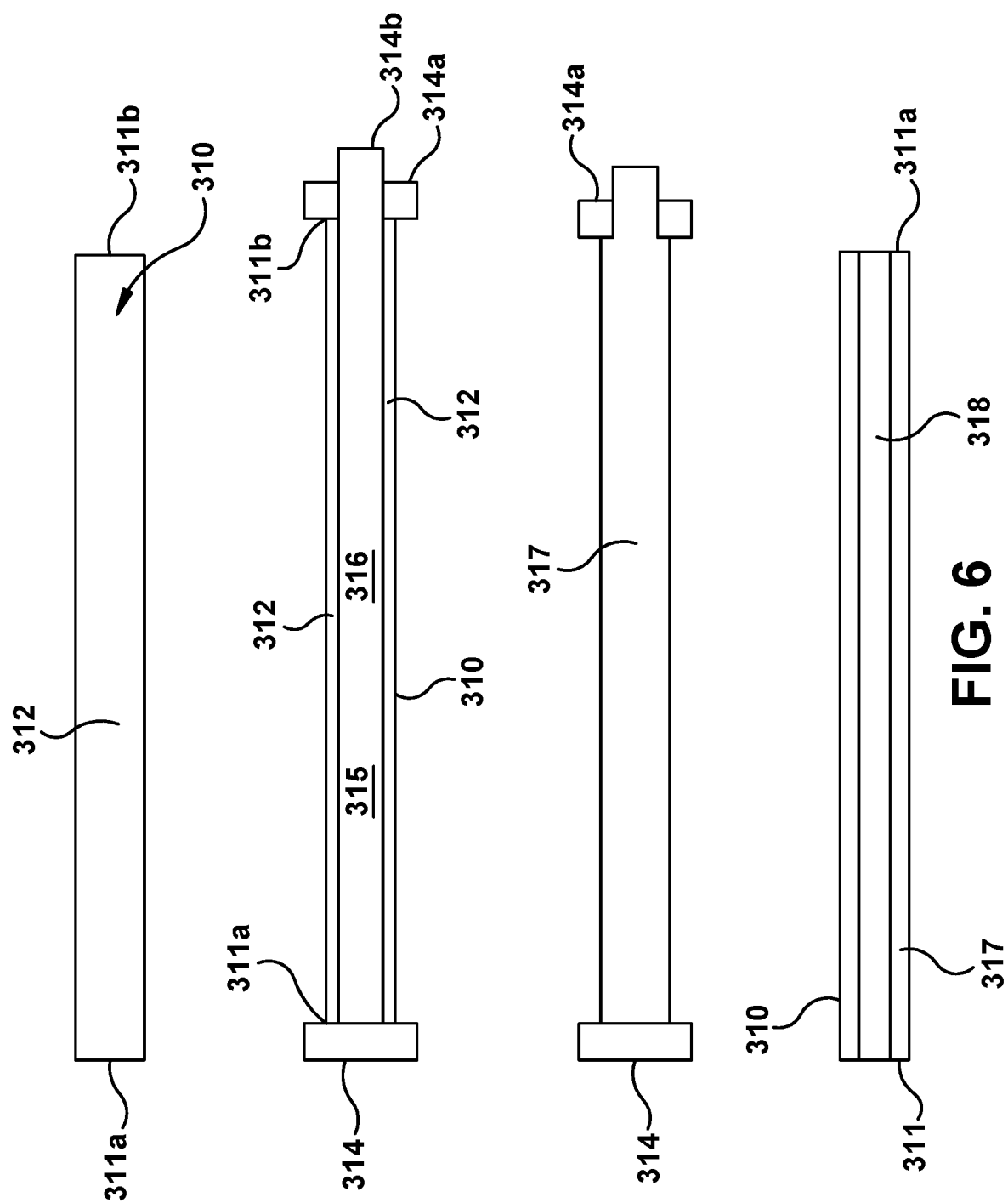

BRAZE METHOD TO MODIFY A PASSAGE

TECHNICAL FIELD

The disclosure relates generally to a process and system to modify and reform a passage, cooling passage, or cooling passage hole in a component. More particularly, the disclosure relates generally to a process and system to modify and reform a cooling passage or cooling passage hole in a hot gas path component.

BACKGROUND

In a gas turbine engine, hot combustion gases generally flow from one or more combustors through a transition piece and along a hot gas path. A number of turbine stages typically are disposed in series along the hot gas path so that the combustion gases flow through first-stage nozzles and blades and subsequently through nozzles and blades (sometimes referred collectively to as "blades") of later stages of the turbine. In this manner, the turbine blades are subjected to high temperatures resulting from the combustion gases flowing along the hot gas path. Because the efficiency of a gas turbine engine is dependent on its operating temperatures, there is an ongoing demand for components positioned along the hot gas path, such as turbine blades, to be capable of withstanding increasingly higher temperatures without failure or decrease in useful life.

Certain turbine blades, particularly those of later turbine stages, may include a number of cooling passages extending radially through the turbine blade. In this manner, the cooling passages may transport a cooling fluid, such as air, through the turbine blade for exchanging heat in order to maintain the temperature of the turbine blade within an acceptable range. According to one known cooling hole configuration, the turbine blade may include a number of long, straight cooling passages formed by shaped-tube electrolytic machining, otherwise known as "STEM drilling." Moreover, the straight cooling passages can provide cooling paths in a tip shroud for cooling the tip shroud. Cooling passages or cooling passages formed in some turbine blades may include a constant diameter and thus may not address the variation in cooling needs along the radial length of the turbine blade. Specifically, as a result of the constant diameter, an undesirable amount of heat may be transferred to the cooling fluid before it reaches a tip shroud region of the turbine blade where cooling needs are greater.

Multiple cooling passages are provided in a blade tip shroud. However, a wall thickness of some of the holes in the blade tip shroud may be too thin. Accordingly, sealing the holes and passages may be required. Sealing may include a brazing process.

BRIEF DESCRIPTION

All aspects, examples and features mentioned below can be combined in any technically possible way.

An aspect of the disclosure provides a process of modifying a passage in a component. The process includes inserting a first material into the passage; blocking at least one end of the passage; inserting an elongated member into the passage through the first material; heat treating the passage, the first material, and the elongated member to form a solid interior in the component; and machining through the solid interior to form a modified passage in the component.

Another aspect of the disclosure includes any of the preceding aspects, and the first material includes a braze material.

Another aspect of the disclosure includes any of the preceding aspects, and the braze material is a mixture of high melt material and low melt material.

Another aspect of the disclosure includes any of the preceding aspects, and the inserting the braze material includes inserting the braze material into the passage from a positive displacement braze applicator.

Another aspect of the disclosure includes any of the preceding aspects, and the inserting the braze material includes inserting the braze material into the passage by applying negative pressure to the passage to pull braze material into the passage.

Another aspect of the disclosure includes any of the preceding aspects, and the inserting the braze material further includes inserting the braze material into the passage from a positive displacement braze applicator.

Another aspect of the disclosure includes any of the preceding aspects, and further including monitoring the inserting of braze material into the passage.

Another aspect of the disclosure includes any of the preceding aspects, and the blocking at least one end of the passage includes completely blocking one end of the passage with a first member.

Another aspect of the disclosure includes any of the preceding aspects, and the blocking at least one end of the passage includes partially blocking a second end of the passage with a second member, the second member including a hole.

Another aspect of the disclosure includes any of the preceding aspects, and the inserting the elongated member into the passage includes inserting the elongated member through the hole of the second member until the elongated member abuts the first member.

Another aspect of the disclosure includes any of the preceding aspects, and wherein heat treating the passage, the first material, and the elongated member includes a thermal brazing cycle.

Another aspect of the disclosure includes any of the preceding aspects, wherein the machining through the solid interior includes drilling a hole to form a modified passage in the component.

Another aspect of the disclosure includes any of the preceding aspects, and further including conforming the at least one end of the modified passage to a component surface.

Another aspect of the disclosure includes any of the preceding aspects, and the component includes a turbomachine component.

Another aspect of the disclosure includes any of the preceding aspects, and the turbomachine component includes a shroud, and the passage includes a cooling passage in the shroud.

An aspect of the disclosure provides a process of modifying a passage in a component. The process includes inserting an elongated member into the passage; inserting a first material into the passage; blocking at least one end of the passage; heat treating the passage, the first material, and the elongated member to form a solid interior in the component; and machining through the solid interior to form a modified passage in the component.

Another aspect of the disclosure includes any of the preceding aspects, and the first material includes a braze material.

Another aspect of the disclosure includes any of the preceding aspects, and the inserting the braze material into the passage includes inserting the braze material by applying negative pressure to the passage to pull braze material into the passage and further inserting the braze material into the passage from a positive displacement braze applicator.

Another aspect of the disclosure includes any of the preceding aspects, and the component includes a turbomachine component including a shroud, and the passage includes a cooling passage in the shroud.

An aspect of the disclosure provides a process of modifying a passage in a component. The process includes inserting a braze into the cooling passage; blocking at least one end of the cooling passage; inserting a rod into the cooling passage through the braze; heat treating the cooling passage in a thermal brazing cycle, the braze, and the rod to form a solid braze interior in the shroud; and machining through the solid braze interior to form a modified cooling passage in the shroud; and wherein the inserting the braze into the cooling passage includes inserting the braze by applying negative pressure to the passage to pull braze into the passage and further inserting the braze into the passage from a positive displacement braze applicator.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the embodiments taken in conjunction with the accompanying drawings that depict various embodiments of the disclosure, in which:

FIG. 6 illustrates a schematic view of steps in modifying and reforming a thickness of a passage, such as a cooling passage in a hot gas path in a component, according to embodiments of the disclosure;

Figure 1:
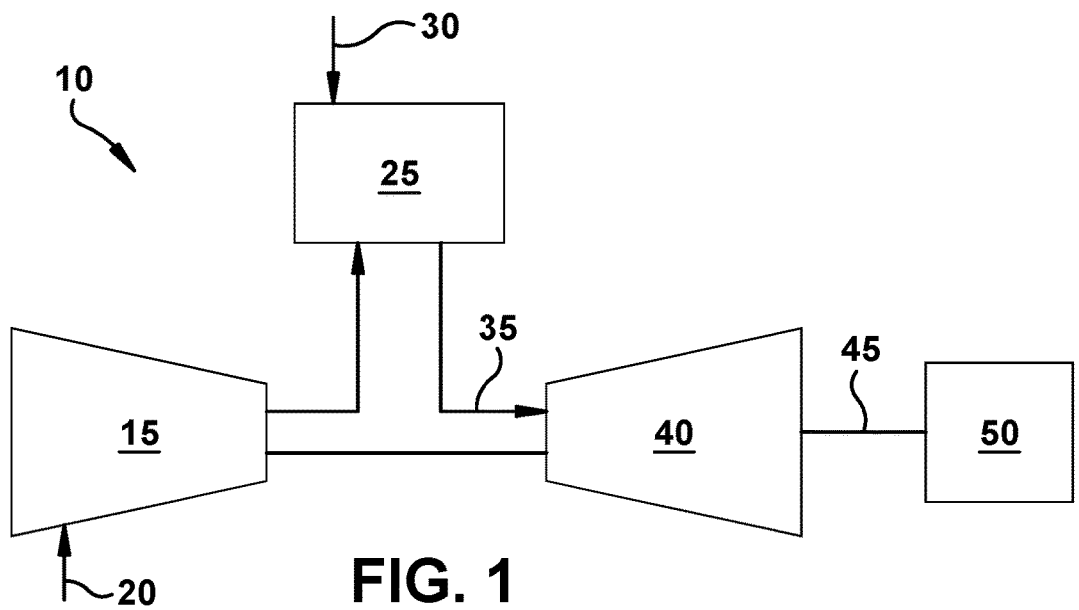
FIG. 1 illustrates a schematic diagram of a gas turbine engine including a compressor, a combustor, and a turbine, according to embodiments of the disclosure.

It is noted that the drawings of the disclosure are not necessarily to scale. The drawings are intended to depict only typical aspects of the embodiments and therefore should not be considered as limiting the scope of the embodiments. In the drawings, like numbering represents like elements between the drawings.

DETAILED DESCRIPTION

As an initial matter, in order to clearly describe the subject matter of the current disclosure, it will become necessary to select certain terminology when referring to and describing relevant steps and components within a method and system to seal a passage or hole. As embodied by certain aspects of the embodiments, the method and system may seal a passage or hole in a hot gas path component, such as in a hot gas path component of turbomachinery. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring now to the drawings, in which like numerals refer to like elements throughout the several views. FIG. 1 illustrates a schematic view of a gas turbine engine 10 as may be used herein. Gas turbine engine 10 may include a compressor 15. Compressor 15 compresses an incoming flow of air 20. Compressor 15 can deliver the compressed flow of air 20 to a combustor 25. Combustor 25 mixes the compressed flow of air 20 with a pressurized flow of fuel 30 and ignites the mixture to create a flow of combustion gases 35. Although only a single combustor 25 is illustrated, gas turbine engine 10 may include any number of combustors 25. The flow of combustion gases 35 is in turn delivered to a turbine 40. The flow of combustion gases 35 drives the turbine 40 so as to produce mechanical work. Mechanical work produced in the turbine 40 drives compressor 15 via a shaft 45 and an external load 50, such as, but not limited to, an electrical generator and the like. Other configurations and other components may be used herein.

Gas turbine engine 10 may use natural gas, various types of syngas, and/or other types of fuels. Gas turbine engine 10 may be any one of a number of different gas turbine engines offered by General Electric Company of Schenectady. N.Y., including, but not limited to, those such as a 7 or a 9 series heavy duty gas turbine engine and the like. Gas turbine engine 10 may have different configurations and may use other types of components. Other types of gas turbine engines also may be used herein. Multiple gas turbine engines, other types of turbines, and other types of power generation equipment also may be used herein together. Although gas turbine engine 10 is shown herein, the present application may be applicable to any type of turbo machinery.

Figure 2:
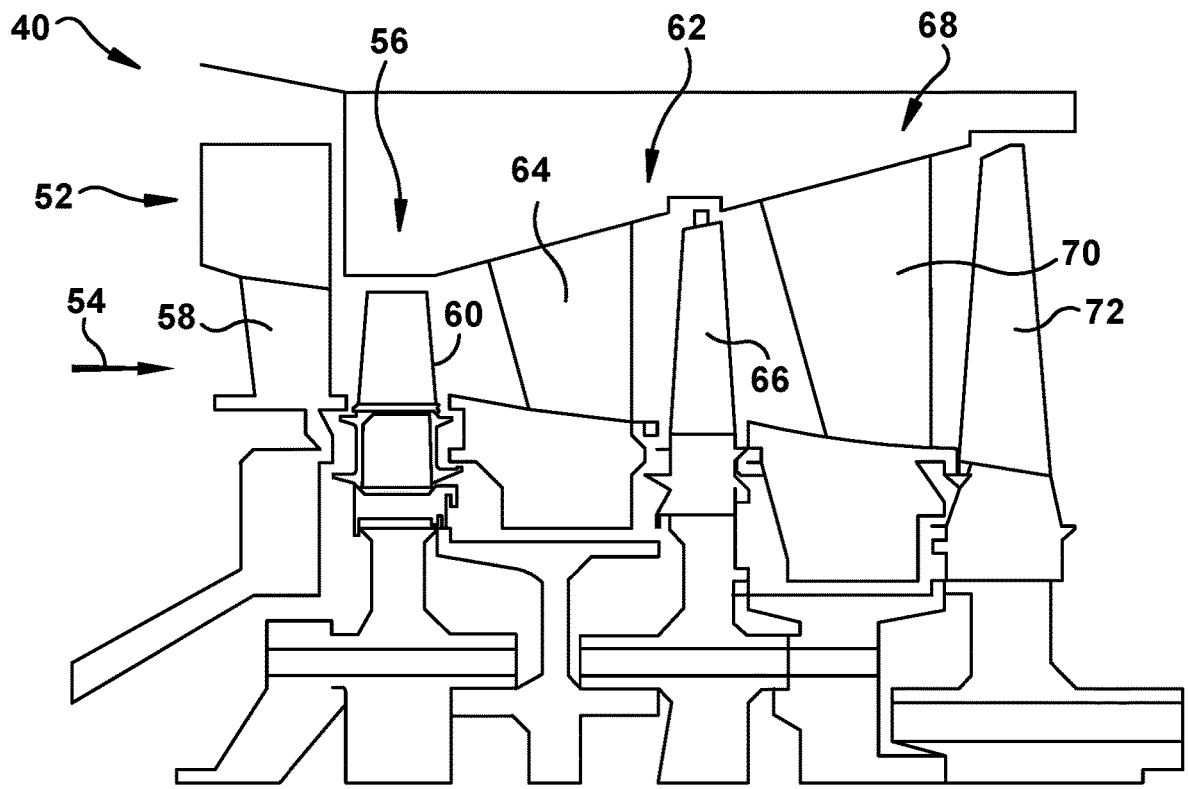
FIG. 2 illustrates a schematic diagram of a portion of a turbine as may be used in the gas turbine engine of FIG. 1, showing a number of turbine stages, according to embodiments of the disclosure.

FIG. 2 illustrates a schematic view of a portion of turbine 40 including a number of stages 52 positioned in a hot gas path 54 of gas turbine engine 10. A first stage 56 may include a number of circumferentially spaced first-stage nozzles 58 and blades 60. Likewise, a second stage 62 may include a number of circumferentially spaced second-stage nozzles 64 and blades 66. Further, a third stage 68 may include a number of circumferentially spaced third-stage nozzles 70 and blades 72. Although the portion of turbine 40 is shown as including three stages 52, turbine 40 may include any number of stages 52.

Figure 3:
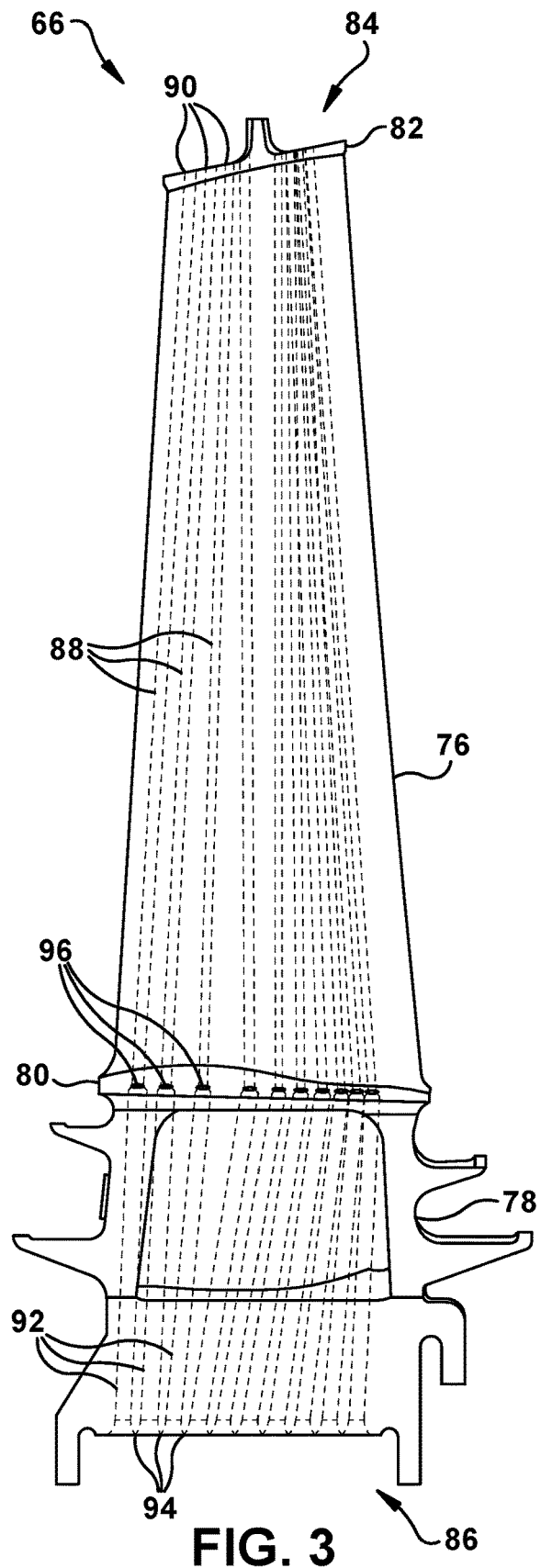
FIG. 3 illustrates a front view of a known turbine blade as may be used in the turbine of FIG. 2, showing a number of cooling passages illustrated by hidden lines according to embodiments of the disclosure.

FIG. 3 illustrates a front plan view of one of blades 66 of second stage 62 of turbine 40. As is known, blade 66 may include an airfoil 76, a shank 78, and a platform 80 disposed between airfoil 76 and shank 78. Airfoil 76 may extend radially upward from platform 80 to a tip shroud 82 positioned about a tip end 84 of blade 66. Tip shroud 82 may be integrally formed with airfoil 76. Shank 78 may extend radially downward from platform 80 to a root end 86 of blade 66, such that platform 80 generally defines an interface between airfoil 76 and shank 78. As is illustrated, platform 80 may be formed so as to be substantially planar and to be generally horizontal when blade 66 is positioned within turbine 40 for use. Shank 78 may be formed to define a root structure, such as a dovetail, configured to secure blade 66 to a turbine disk of turbine 40.

During operation of gas turbine engine 10, the flow of combustion gases 35 travels along hot gas path 54 and over platform 80, which forms the radially inner boundary of hot gas path 54. Accordingly, the flow of combustion gases 35 is directed against airfoil 76 of blade 66. Thus, surfaces of airfoil 76 are subjected to very high temperatures.

Figure 4:
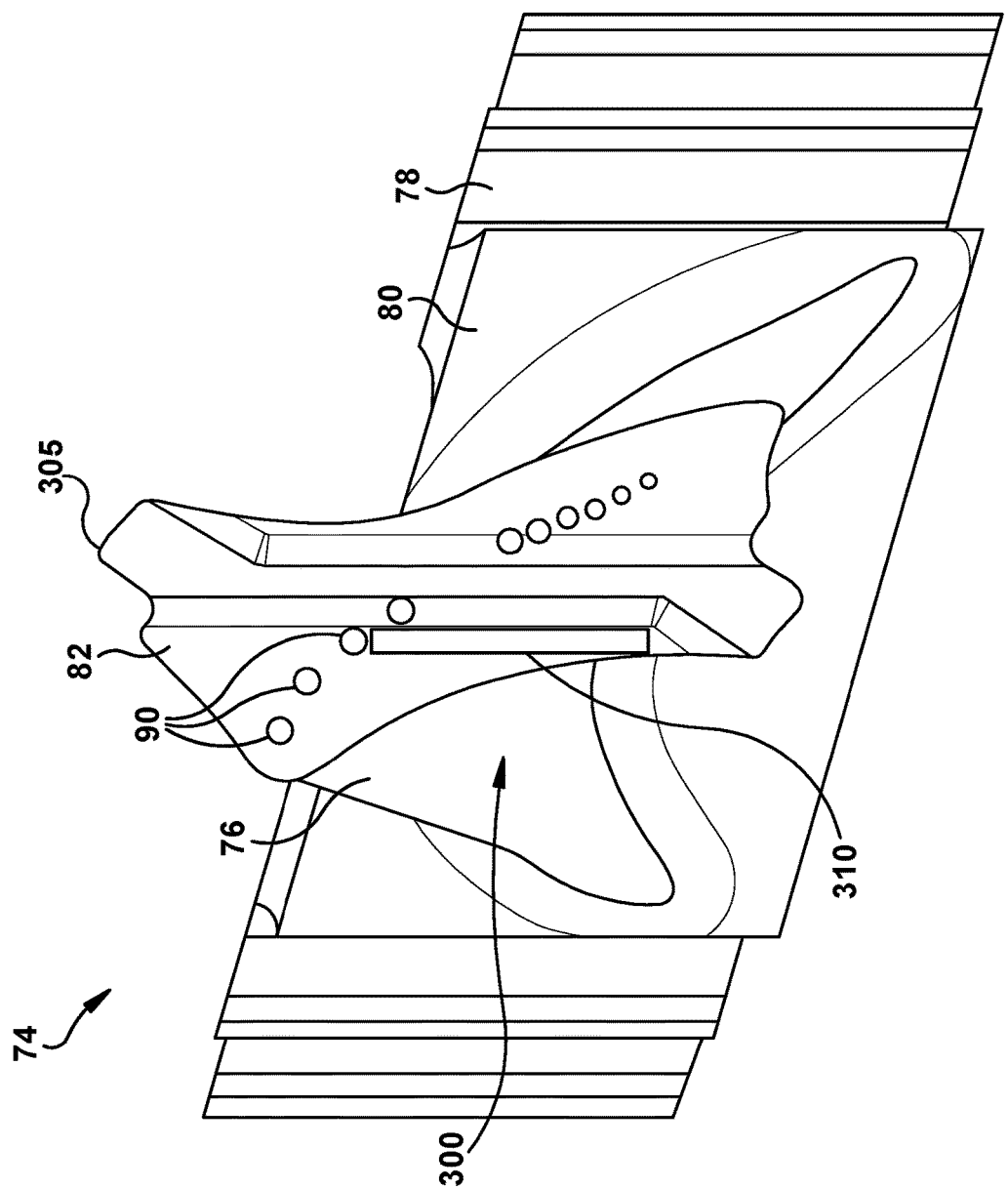
FIG. 4 illustrates a top view of the turbine blade of FIG. 3, according to embodiments of the disclosure.

As is illustrated in FIGS. 3 and 4, blade 66 may include a number of passages such as cooling holes or cooling passages 88 (illustrated via hidden lines and hereinafter "passages") defined within airfoil 76. Each passage 88 may extend radially from platform 80 to an outlet 90 defined in tip shroud 82 at tip end 84 of blade 66. Passages 88 may be formed by conventional STEM drilling, and thus they may have a generally circular cross-sectional shape and a constant diameter along the length of passages 88. Other configurations of passages 88 may include elliptical cross-sectional shapes. Further, some passages 88 may include tubulation and/or turbulated holes with varying diameters. Blade 66 also may include a number of feed holes 92 (illustrated via hidden lines) defined within shank 78. Each feed hole 92 may extend radially from an inlet 94 defined in shank 78 at root end 86 of blade 66 to platform 80. As is illustrated, at least one feed hole 92 may be in direct communication with one of passages 88 at an interface 96 positioned in or near platform 80. Feed holes 92 also may be formed by conventional STEM drilling, and thus they may include a generally circular cross-sectional shape and a constant diameter along the length of feed holes 92.

During operation of gas turbine engine 10, a cooling fluid, such as bleed air from compressor 15, may be directed into feed holes 92 via inlets 94 and subsequently may pass through passages 88 and exit blade 66 via outlets 90. Accordingly, heat may transfer from blade 66, and in particular airfoil 76, to cooling fluid as it passes through passages 88 and then is directed into hot gas path 54 at tip end 84 of blade 66.

Figure 5:
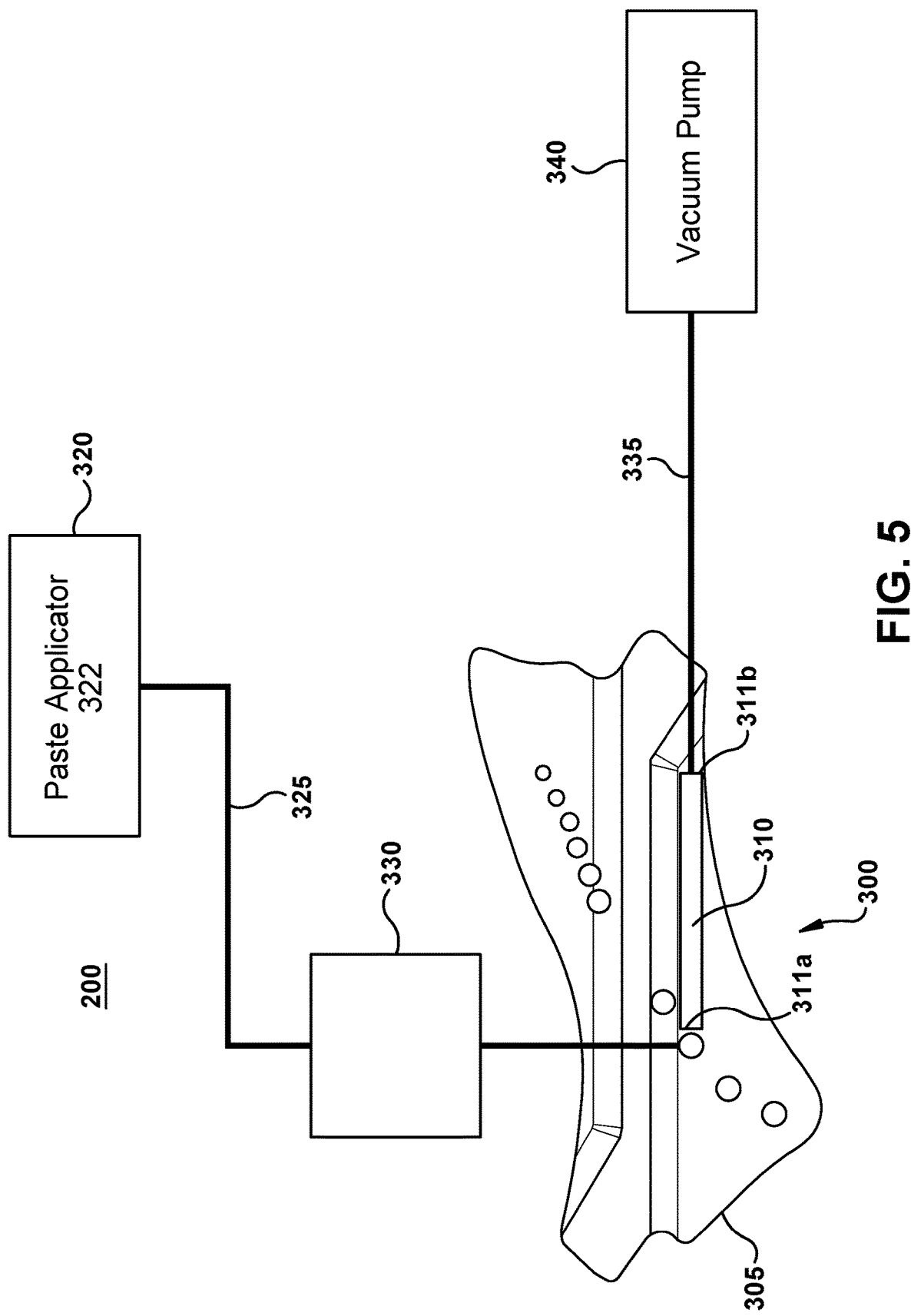
FIG. 5 illustrates a system for modifying and reforming a thickness of a passage, such as a cooling passage in a hot gas path in a component, according to embodiments of the disclosure.

FIG. 5 illustrates a schematic view of a system for modifying a passage such as, but not limited to a passage 310. Passage 310 may be provided in a shroud 305 of a hot gas path turbomachinery component 300. Hot gas path turbomachinery component 300 may include at least one of combustion liners, transition pieces, shrouds, turbine nozzles and turbine buckets. Passage 310 is in fluid communication with passage 88 (FIG. 3). Shroud 305 may include at least one passage 310 through shroud 305 and shroud 305 may include a plurality of passages 310 through shroud 305. Passage 310 through shroud 305 are robust to provide cooling to blade tip shrouds, however in some circumstances, one or more passage 310 may be formed of a wall thickness without a desired thickness or is not formed for desired airflow therein. In order to provide passage 310 with the desired thickness, system 200 can be employed to modify and reform passage 310 and provide passage 310 with an adequate thickness to withstand the rigors of hot gas path conditions.

FIG. 6 illustrates a schematic view of steps in modifying and reforming a thickness of a passage, such as a passage in a hot gas path in a component. As illustrated in FIGS. 5 and 6, passage 310 includes two ends, end 311a and end 311b. End 311a is configured to be connected to a braze source 320, such as, but not limited to a positive displacement device, including a paste applicator 322. End 311b is configured to be attached to a negative pressure source 340, such as but not limited to, a vacuum pump.

Braze source 320, such as positive displacement braze applicator 322, contains a first material, wherein first material includes at least one of a braze material, braze powder, braze paste, or braze 312 (hereinafter "braze 312"). Braze 312 is used to modify and reform a passage. Braze 312 can include, but is not limited to, a pure low melt braze, including DF4B and D15 (DF4B has a "low" melting point temperature of about 1120° C. and D15 has a melting point of about 1160° C.). Braze 312 can include, but is not limited to, a high melt/low melt powder mixture or braze material such as MarM247/DF4B, in a ratio between from about 20/80 high melt material/low melt material and about 80/20 high melt material/low melt material. MarM247 has a "high" melting point temperature in a range of about 1220° C. to about 1270° C. One braze high melt material/low melt material ratio is about 50/50.

Braze source 320, such as positive displacement braze applicator 322 is configured to be connected to a monitoring assembly 330 by a conduit 325. Conduit 325 is configured to be attached to end 311a of passage 310. Monitoring assembly 330 can include at least one monitoring schema configured to permit determination of a flow of braze from braze source 320 to end 311a. Thus, in accordance with aspects of the embodiments, monitoring assembly 300 can include, but not limited to one or more of, flow sensors to determine flow past monitoring assembly 330, a clear section of conduit 325 through which visual confirmation of braze 312 flow can be assessed, or other such flow monitoring devices. In certain aspects of the embodiments, flow sensors to determine flow past monitoring assembly 330 can include at least one of mechanical flow indication structures, electronic sensors that sense flow in conduit 325, positive displacement flow sensors, mass flow sensors, velocity flow sensors, or other flow sensing schema now known or hereinafter developed.

In another aspect of the embodiments, conduit 325 may be formed at least in part or entirely from clear material. Thus, visual confirmation of a flow of braze 312 can be assessed all along conduit 325. If conduit 325 is formed at least in part from clear material for visual confirmation, the clear part of conduit 325 may be circumferential around conduit 325 or longitudinally oriented in conduit 325 to enable visual confirmation of a flow of braze 312 at the clear portion of conduit 325.

A negative pressure source 340, such as but not limited to a vacuum pump, is connected to end 311b of passage 310. In certain aspects, vacuum pump can include at least one of rotary vane vacuum pumps, diaphragm vacuum pumps, liquid ring vacuum pumps, scroll vacuum pumps, turbomolecular vacuum pumps, or any vacuum pump apparatus now known or hereinafter developed. Negative pressure source 340 is connected to end 311b of passage 310 through a further conduit 335. Negative pressure source 340 pulls a negative pressure at end 311b of passage 310.

Figure 7:
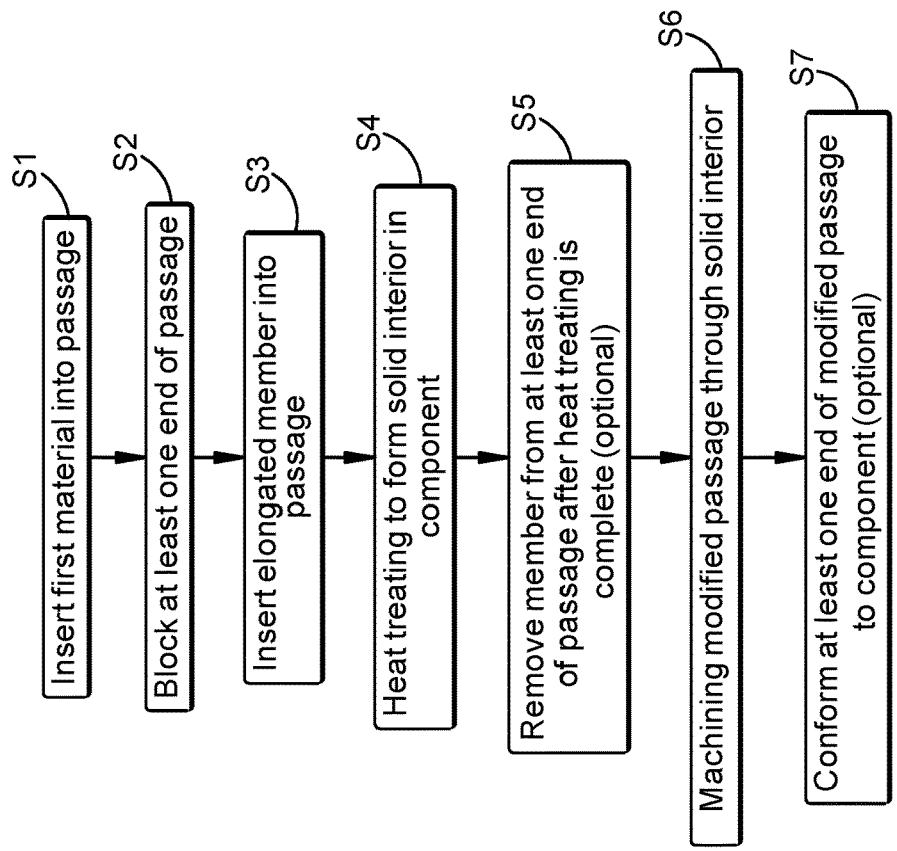
FIG. 7 is a flowchart illustrating a process for modifying and reforming a thickness of a passage, such as a cooling passage in a hot gas path in a component, according to embodiments of the disclosure.

A process for providing and enhancing thickness of passage 310 in shroud 305 of a hot gas component 300 will now be described with respect to FIGS. 5-7. Step S1 includes inserting a first material into passage 310. In this step, passage 310 is filled with first material, such as braze 312, by inserting or filling braze 312 into passage 310. A combination of braze source 320 providing a motive or positive force to braze 312 moving braze 312 through conduit 325 and inserting braze 312 into end 311a. At the same time, negative pressure source 340 applies a negative pressure through end 311b in STEP S1 (FIG. 7) enables the pulling of braze 312 out of passage 310 to move and further insert braze 312 in and through passage 310 and fill passage 310 with braze 312 as illustrated in FIG. 6.

As noted herein, braze source 320 provides a force on braze 312 to move braze 312 through conduit 325 and into end 311a in passage 310. Moreover, the negative pressure source 340 connected through conduit 335 to end 311b applies a negative pressure in passage 310 to pull anything, including braze 312, through passage 310. Accordingly, braze 312 will enter passage 310.

Once passage 310 is full of braze 312, operation of system 200 is halted for that particular passage 310. System 200 can apply braze into multiple passage 310 if multiple passages 310 need wall thickness modification.

Once the desired passage(s) 310 has been filled with braze 312, in step S2, blocking of at least one end 311a, 311b is performed. End 311a and 311b can be blocked with a member 314 or 314a. Member 314 is disposed at one end 311a of passage 310 and seals and closes end 311a. As illustrated in FIG. 6, member 314 blocks end 311a of passage 310.

Member 314a is disposed at the other end 311b of passage 310. As embodied by the disclosure, member 314a includes a hole 314b. Member 314a is disposed at end 311b, so end 311b is not blocked. In accordance with certain aspects, member 314a is disposed at end 311b so that hole 314b is aligned concentrically and coaxially with a central access of passage 310. Hole 314b allows access to passage 310 for machining operations, as will be described hereinafter.

Members 314 and 314a can be formed from a material that is compatible with at least one of materials of braze 312 and materials of component 300. Accordingly, as in certain embodiments, members 314 and 314a may include a superalloy, such as a nickel base superalloy, a cobalt base superalloy, an iron base superalloy, or other materials that are compatible with materials of braze 312 and/or component 300 materials. In further aspects of the embodiments, members 314 and 314a may be formed from a "NiCo strips" that include nickel or cobalt foils, blocks, or strips of superalloy.

Once all passages 310 that were to be modified are filled with braze 312, members 314 and 314a are disposed on ends 311a and 311b. Members 314 and 314A can be physically connected to ends 311a and 311b. In certain embodiments, members 314 and 314a can be connected to passage 310 by one or more of welding including tack welding, riveting, soldering, bolting, brazing, or any other connecting process now known or hereinafter developed. The connection of members 314 and 314a to passage 310 is configured to be strong enough for modification steps of the process to occur after Step S2. Additionally, members 314 and 314a configured to be connected to ends 311a and 311b of passage 310 to enable and facilitate disconnection/removal of members 314 and 314a from ends 311a and 311b of passage 310, for continued processing, as described hereinafter.

Once members 314 and 314a are attached to ends 311a and 311b of passage 310, with braze 312 still malleable, pliable, or plastic in passage 310, the process continues at step S3. Step S3 includes inserting an elongated member into passage 310 through the first material, e.g., braze 312. More particularly, an elongated member, such as an elongated member 316 (hereinafter "elongated member 316") is inserted through hole 314b into passage 310. While the elongated member is disclosed as a rod, any configuration of an elongated member, such as but not limited to oval elongated member, polygonal elongated member, or other such configuration now known or hereinafter developed, can be employed as the elongated member. Elongated member 316 includes a solid element, such as but not limited to, an elongated wire, bar, or the like. Elongated member 316 can be formed from the material of component 300. For example, if component 300 is formed of a superalloy, elongated member 316 may also be formed of that material. The material of elongated member 316 should be compatible with the material of component 300. Also, elongated member 316 is provided with a close or same diameter as a diameter of hole 314b.

Elongated member 316 is inserted into passage 310 through and against braze 312. Elongated member 316 is inserted fully into passage 310 until an end of elongated member 316 abuts member 314 (FIG. 6). Member 314 entirely closes passage 310, thus member 314 stops further insertion of elongated member 316 into passage 310 when elongated member 316 abuts member 314. Additionally, little if any, braze 312 escapes passage 310 through hole 314b, as diameters of elongated member 316 and hole 314b are substantially equal.

In accordance with aspects of the embodiments, passage 310 has a diameter in a range between about 0.38 centimeters (cm) and about 1.3 centimeters (cm) (between about 0.015" and about 0.0.5"). A ratio of length to diameter (L/D) can be greater than 5. Further, the ratio of length to diameter (L/D) can be in a range between about 5 and about 300.

Accordingly, elongated member 316 compresses braze 312 in passage 310. A high density paste composition 315 is then formed, with high density composition 315 including braze 312 and elongated member 316 formed within passage 310. Elongated member 316 can be formed of any length. For example, and in no way limiting of the embodiments, elongated member 316 can be configured to be a substantially equivalent length of passage 310. Thus, elongated member 316 is configured to fit entirely in passage 310 and an end of elongated member 316 will be disposed coplanar with an outer surface of member 314a at hole 314b. As embodied by another aspect of the disclosure, elongated member 316 can be configured to have a length greater than the length of passage 310. Accordingly, after inserting elongated member into passage 310, the portion of elongated member 316 that extends out of member 314A can be removed so that the now cut end of elongated member 316 lies coplanar with member 314a at hole 314b.

Once elongated member 316 is fully disposed within passage 310, any further passages 310 within shroud 305 that are deemed to need their thickness modified will be processed in an analogous manner according to steps S1-S3, as discussed above.

When all passages 310 deemed to need thickness modified are filled with braze 312 and elongated member 316, step S4 includes heat treating the passage, the first material and the elongated member to form a solid interior in the component. The heat treatment may include, for example heat treating in a braze thermal cycle. The braze thermal cycle will solidify braze 312 to elongated member 316 and form a solid interior 317, i.e., braze 312 forms a solid braze interior in passage 310. After completion of the braze thermal cycle, with some or all cooling of component 300 occurs as appropriate, members 314 and 314a may be removed from shroud 305 and passage 310 in optional step S5.

Once members 314 and 314a have been removed, step S6 includes machining through the solid interior to form a modified passage in component 300. Here, a hole 318 may be machined through solid braze interior 317 in passage 310 at step S6. Machining of hole 318 can be performed by drilling with a drill bit having a diameter that is substantially the desired internal diameter of passage 310. Thus, with a desired internal diameter, passage 310 will be provided with a wall thickness desired.

Accordingly, drilling of hole 318 from one end 311 to the other end 311a (or from end 311a to end 311 as the direction of drilling is immaterial to the resulting structure), passage 310 will be modified to have a wall thickness, as desired. The desired modified passage 310 includes a wall formed of the solid braze interior 317. Depending on modified desired wall thickness of passage 310, part of elongated member 316 may remain in passage 310 along with braze 312 as braze 312 and elongated member 316 form solid braze interior 317 through which hole 318 is drilled.

The process can include an optional step S7 to conform at least one of the ends 311a and 311b of modified passage component 300. Conforming of step S7 removes any excess solid braze interior 317 that may not form a coplanar surface with the profile of component 300. Step S7 can include, but is not limited to machining, polishing, grinding, or any other process to remove material now known or hereinafter developed.

Figure 8:
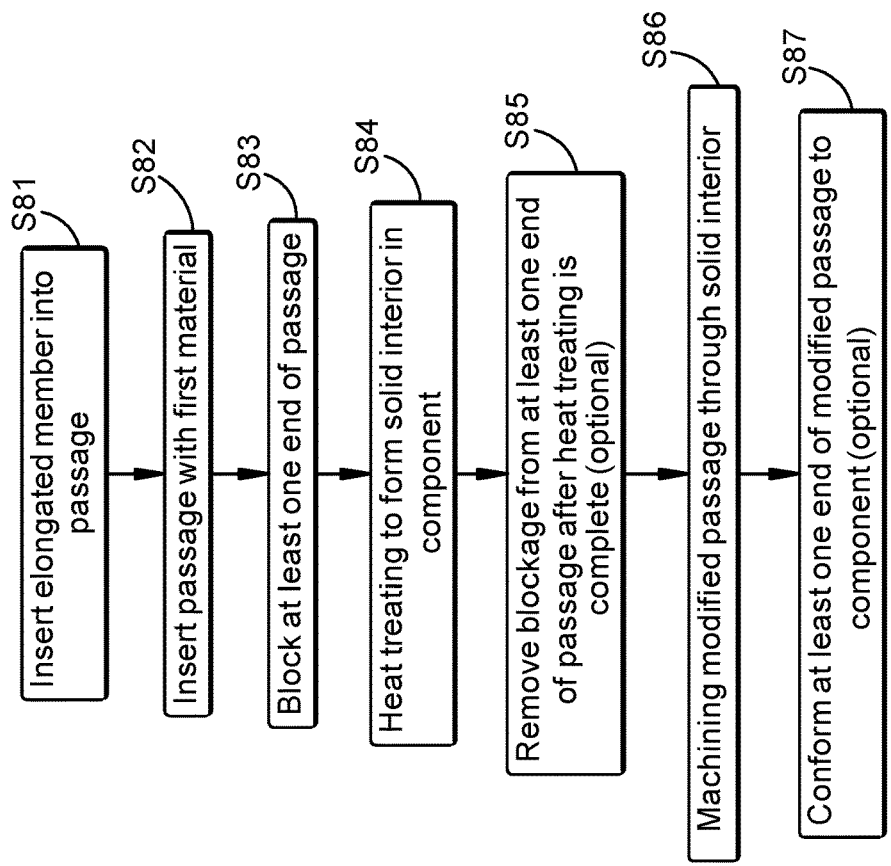
FIG. 8 is a flowchart illustrating a further process for modifying and reforming a thickness of a passage, such as a cooling passage in a hot gas path in component, according to embodiments of the disclosure.

FIG. 8 illustrates a flowchart for a further process, as embodied by the disclosure. Steps S84-S87 are substantially the same as the process steps S4-S7 of FIG. 7. However, in the process of FIG. 8, elongated member 316 is first inserted into passage 310 in step S81. Next, in step S82, braze 312 fills passage 310, with braze 312 flowing around elongated member 316. Thereafter, in step S83, members 314 and 314a are disposed on ends 311a and 311b. Thereafter, process steps S84-S86 and optionally step S87 can be carried out as with the process of FIG. 7.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A process of modifying a passage in a component, the process including:

inserting a first material into the passage;

blocking at least one end of the passage;

inserting an elongated member into the passage through the first material to compress the first material in the passage;

heat treating the passage, the first material, and the elongated member to form a solid interior in the component; and machining through the solid interior to form a modified passage in the component.

2. The process according to claim 1, wherein the first material includes a braze material.

3. The process according to claim 2, wherein the braze material is a mixture of high melt material and low melt material.

4. The process according to claim 2, wherein inserting the braze material includes inserting the braze material into the passage from a positive displacement braze applicator.

5. The process according to claim 2, wherein inserting the braze material includes inserting the braze material into the passage by applying negative pressure to the passage to pull braze material into the passage.

6. The process according to claim 5, wherein inserting the braze material further includes inserting the braze material into the passage from a positive displacement braze applicator.

7. The process according to claim 2, further including monitoring the inserting of braze material into the passage.

8. The process according to claim 1, wherein the blocking at least one end of the passage includes completely blocking one end of the passage with a first member.

9. The process according to claim 8, wherein the blocking at least one end of the passage includes partially blocking a second end of the passage with a second member, the second member including a hole.

10. The process according to claim 9, wherein inserting the elongated member into the passage includes inserting the elongated member through the hole of the second member until the elongated member abuts the first member.

11. The process according to claim 1, wherein heat treating the passage, the first material, and the elongated member includes a thermal brazing cycle.

12. The process according to claim 1, wherein machining through the solid interior includes drilling a hole to form the modified passage in the component.

13. The process according to claim 1, further including conforming at least one end of the modified passage to a component surface.

14. The process according to claim 1, wherein the component includes a turbomachine component.

15. The process according to claim 14, wherein the turbomachine component includes at least one of combustion liners, transition pieces, shrouds, turbine nozzles and turbine buckets, and the passage includes a cooling passage in the turbomachine component.

16. A process of modifying a passage in a component, the process including:

inserting a first material into the passage;

blocking a first end of the passage with a first member;

partially blocking a second end of the passage with a second member, the second member including a hole;

inserting an elongated member through the hole of the second member until the elongated member abuts the first member;

heat treating the passage, the first material, and the elongated member to form a solid interior in the component; and machining through the solid interior to form a modified passage in the component.

17. The process according to claim 16, wherein the first material includes a braze material.

18. The process according to claim 17, wherein inserting the braze material into the passage includes inserting the braze material by applying negative pressure to the passage to pull braze material into the passage and further inserting the braze material into the passage from a positive displacement braze applicator.

19. The process according to claim 16, wherein the component includes a turbomachine component including at least one of combustion liners, transition pieces, shrouds, turbine nozzles and turbine buckets, and the passage includes a cooling passage in the turbomachine component.

20. A process of modifying a cooling passage in a shroud of a turbomachine component, the process including:

inserting a braze into the cooling passage;

blocking at least one end of the cooling passage;

inserting a rod into the cooling passage through the braze to compress the braze in the passage;

heat treating the cooling passage, the braze, and the rod in a thermal brazing cycle to form a solid braze interior in the shroud; and machining through the solid braze interior to form a modified cooling passage in the shroud; and wherein inserting the braze into the cooling passage includes inserting the braze by applying negative pressure to the passage to pull braze into the passage and further inserting the braze into the passage from a positive displacement braze applicator.

\* \* \* \* \*